United States Patent [19]
Larson

[11] 4,225,104
[45] Sep. 30, 1980

[54] HANDLE FOR MOBILE INTRAVENOUS STAND

[76] Inventor: Godfrey R. Larson, 316 N. Fifth Ave., Virginia, Minn. 55792

[21] Appl. No.: 962,288

[22] Filed: Nov. 20, 1978

[51] Int. Cl.² ............................................. F16M 13/00
[52] U.S. Cl. .................................. 248/125; 248/311.3; 248/316 B; 16/114 R
[58] Field of Search ................... 16/112, 110 R, 114 R; 248/316 B, 97, 98, 311.3, 96, 125; 211/60 G, 125, 316 B, 311.3

[56] References Cited

U.S. PATENT DOCUMENTS

| | | | |
|---|---|---|---|
| 365,282 | 6/1887 | Tillman | 248/316 B |
| 1,154,904 | 9/1915 | Bain | 248/316 B |
| 2,676,710 | 4/1954 | Williamson | 211/60 G |
| 2,880,012 | 3/1959 | Wilson | 211/60 G |
| 2,932,526 | 4/1960 | Campbell | 248/98 |
| 2,954,028 | 9/1960 | Smith | 248/311.3 |
| 3,051,505 | 8/1962 | Flanagan | 248/96 |
| 3,460,789 | 8/1969 | McKirdy et al. | 248/311.3 |

*Primary Examiner*—George H. Krizmanich
*Attorney, Agent, or Firm*—Burd, Bartz & Gutenkauf

[57] ABSTRACT

A handle for propelling and steering a mobile stand for holding containers of liquid for intravenous administration, particularly for ambulatory patients. The handle comprises an elongated tiller rod or bar pivotally connected to a clamp which is adapted for engagement with the vertical standard of the intravenous stand. The clamp is constructed so as to be readily disengageable from the stand. The pivot joint between the clamp and the tiller bar or rod is constructed to hold the tiller rigidly in a horizontal position for use, while permitting it to be lowered into vertical position generally parallel to the standard when not in use. A hand grip is desirably provided at the free end of the tiller.

6 Claims, 5 Drawing Figures

HANDLE FOR MOBILE INTRAVENOUS STAND

BACKGROUND OF THE INVENTION

Field of the Invention

This invention is directed to a removable handle for attachment to the mobile stand used for holding containers of liquid for intravenous administration to patients in hospitals and similar health care facilities. Basically the stand comprises a base, having casters to permit it to be readily moved about, with a vertical tubular standard secured to the base and a liquid container holder. The latter comprises a vertical rod adapted for telescopic engagement with the hollow standard at one end and having a horizontal container supporting cross bar at the other. The liquid container holder is adapted to be removable from the stand for attachment to a patient's bed when the patient is not ambulatory. The stand is provided with means for securing the container holder in the standard when the stand is to be moved about.

Often a patient's condition is such that it is necessary that nourishment, vitamins, various drugs, etc. must be administered to him intravenously even though he is ambulatory. Some intravenous administration extend over long periods of time or even are continuous around the clock. At the same time, ambulatory patients are encouraged to exercise. Accordingly, it is a common sight to see a patient walking in a hospital corridor accompanied by a stand carrying one or more containers of liquid being administered intravenously. The stand may be propelled and guided either by the patient himself or by a nurse or other companion.

In either event, guiding the movement of the stand is inconvenient and difficult. The vertical standard must be grasped by the hand. Unless the arm is extended rigidly horizontal, which is not always possible, the distance between the stand and the person propelling it is such that the base of the stand and the feet of the person tend to interfere with one another. The stand is difficult to steer. The present invention is directed to the alleviation of these problems, making it simpler and easier for an intravenous stand to be propelled and steered.

SUMMARY OF THE INVENTION

The invention is directed to a handle for propelling and steering a mobile stand for holding containers of liquid for intravenous administration. The handle comprises an elongated tiller bar or rod. The tiller bar or rod is secured through a pivotal connection to a tube or pipe clamp which is adapted for rigid engagement with the vertical standard of an intravenous stand. The pivotal engagement is such that the axis of rotation of the pivot intersects and is perpendicular to the longitudinal axis of the tiller and the axis of rotation of the pivot is spaced from and is perpendicular to the center line axis of the clamp. Means are provided for maintaining the tiller in a first position rigidly perpendicular to the center line axis of the clamp (horizontal when in use) and permitting the tiller to be moved to a second position generally parallel to the center line axis of the clamp (generally vertical when at rest). The invention also contemplates the combination of an intravenous stand and handle.

BRIEF DESCRIPTION OF THE DRAWINGS

The invention is illustrated in the accompanying drawings in which corresponding parts are identified by the same numerals and in which.

DETAILED DESCRIPTION OF THE PREFERRED EMBODIMENT

Figure 1:
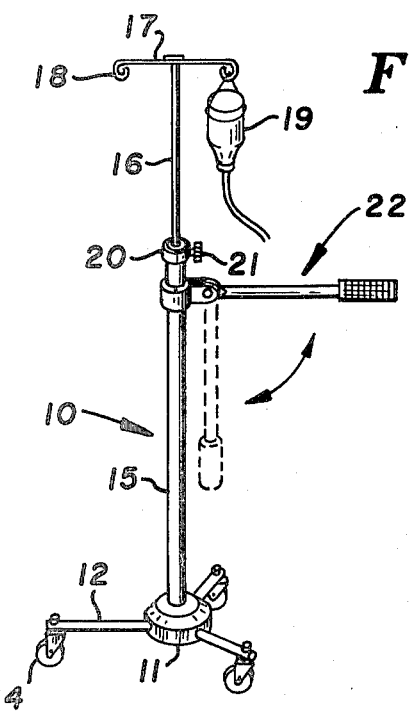
FIG. 1 is a perspective view of a mobile stand for holding containers of liquid for intravenous administration shown with the handle attached.
Figure 2:
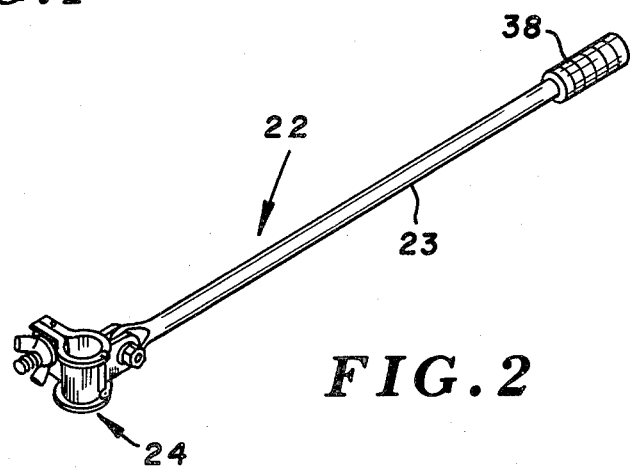
FIG. 2 is a perspective view of one form of handle.
Figure 3:
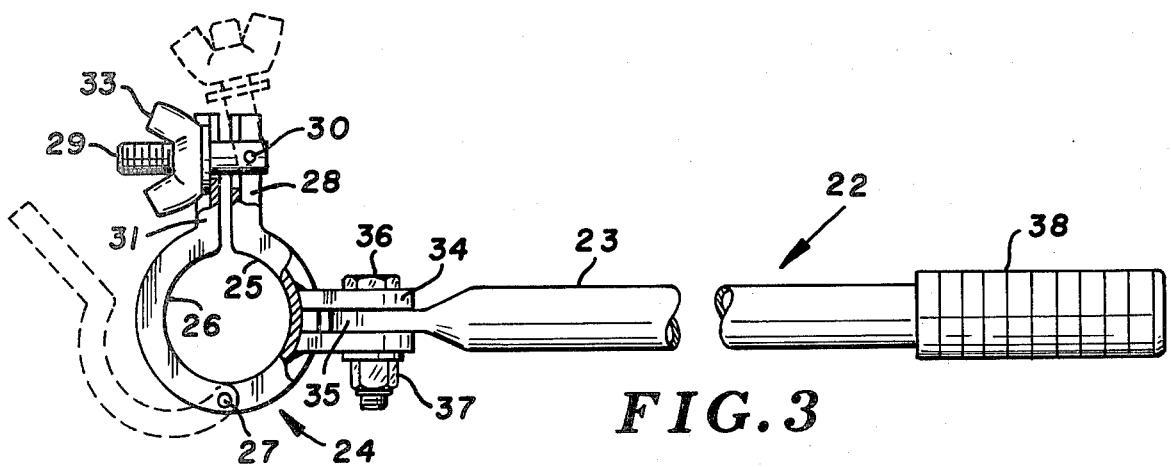
FIG. 3 is an enlarged top view of the handle of FIG. 2.
Figures 4, 5:
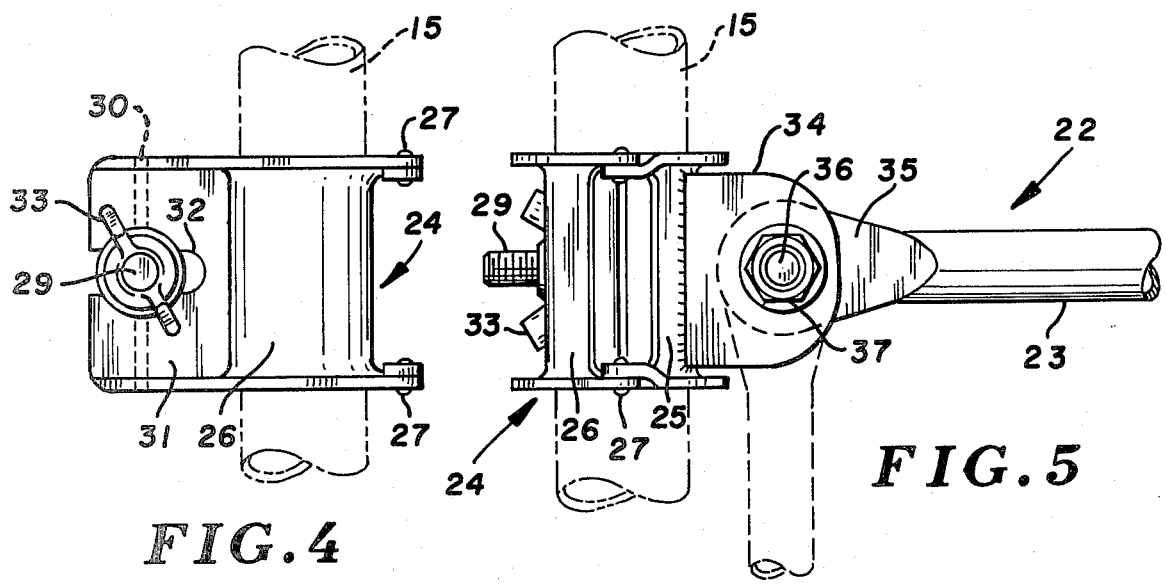
FIG. 4 is an end elevation showing details of one form of clamp.
FIG. 5 is a side elevation of the clamp end of the handle.

Referring now to the drawings, and particularly to FIG. 1, there is shown one form of a mobile stand in common use in hospitals and similar health care centers for holding of containers of liquid for intravenous administration. The stand is used either by positioning at the bedside of the patient or for accompanying the patient if he is ambulatory. The mobile stand, indicated generally at 10, comprises a base in the form of a hub 11 having a plurality of rigid radiating feet 12 each supporting a caster 14 of conventional construction. A tubular vertical standard 15 is supported by the base.

A bottle holder or holder for other liquid containers is supported from the standard. This holder comprises a vertical rod 16 adapted for telescopic engagement with the hollow standard 15. At its upper end the holder is provided with a horizontal cross bar 17 having a hook or loop 18 at each end for supporting a container 19 of intravenous liquid by a bail or similar suspending element.

A collar 20 fitted with a thumb actuated set screw 21 is secured to the top of vertical standard 15 to receive the liquid container holder and secure it at the desired height. The container holder of this form of stand is adapted to be removable from the stand and attached to a bracket on the bed of the patient. A handle, indicated generally at 22, is adapted to be secured to the stand near the top end of the vertical standard 15.

Referring now to FIGS. 2 through 5, handle 22 includes an elongated tiller rod or bar 23 pivotally connected at one end to a clamp 24 which is adapted for engagement with the vertical standard of the intravenous stand. Any of a variety of conventional tube or pipe clamps can be adapted to the present use. Preferably the clamp is one which is readily attached and detached from the vertical standard. The form of clamp which is illustrated includes a fixed arcuate jaw 25 to which a similar complementary arcuate jaw 26 is pivotally secured by pins 27. The free end of fixed jaw 25 has an outwardly extending slotted lip 28 in which a toggle bolt 29 is pivotally supported on pin 30. Movable clamp jaw 26 has a similar outwardly extending lip 31 having a central slot 32 adapted to receive toggle bolt 29. A thumb nut 33 on toggle bolt 29 permits lips 28 and 31 to be squeezed toward one another to enable the clamp to tightly engage the vertical standard 15 of the IV stand.

In the specific form illustrated, the tiller rod or bar 23 is connected to the clamp through a pair of parallel spaced apart lugs 34 welded or otherwise rigidly secured to the fixed clamp jaw 25. In the illustrated form, the end 35 of tiller 23 is flattened and disposed between the lugs. A bolt 36 extends through holes in lugs 34 and flattened tiller end 35. A nut 37 secures the pivot assembly together. The axis of the pivot connection through bolt 36 intersects and is perpendicular to the longitudinal axis of tiller 23. The pivot axis also is perpendicular to the center line axis of clamp 24 but is spaced therefrom.

In use, handle 22 should extend generally horizontally, parallel to the floor and perpendicular to the standard to which it is attached. The pivot connection should be such that the handle will remain in this horizontal position. This may be accomplished through a variety of conventional rotary locking devices, or the handle may be maintained in position merely through frictional engagement of the parts of the pivotal connection, as by spring loading, or through use of elastic stop nuts for frictional control, or the like. When the stand is not in use, it is desirable that the handle be moved to a generally vertical position, as shown in FIG. 1, without the necessity of the use of tools. The handle preferably is provided with a hand grip 38 of rubber or rubber-like material.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A mobile stand for supporting suspended inverted containers of liquid for intravenous administration to patients, said stand comprising:
   (A) a base having casters in the under surface thereof,
   (B) a vertical standard secured to said base,
   (C) a liquid container holder adapted for engagement with said vertical standard and having a generally horizontal container-supporting cross bar,
   (D) means for rigidly securing said container holder and said standard, and
   (E) a handle for propelling and steering said stand, said handle rigidly engaging the standard and comprising:
   (1) an elongated tiller bar or rod,
   (2) a tube or pipe clamp rigidly secured to the vertical standard of said stand,
   (3) a pivotal connection between one end of said tiller and said clamp,
      (a) the axis of rotation of said pivotal connection intersecting and being perpendicular to the longitudinal axis of the tiller, and
      (b) the axis of rotation of said pivotal connection being spaced from and perpendicular to the center line axis of said clamp, and
   (4) means for maintaining said tiller in a first position rigidly perpendicular to the center line axis of said clamp and permitting said tiller to be moved to a second position generally parallel to the center line axis of the clamp.

2. A combination according to claim 1 wherein said handle clamp comprises:
   (A) a fixed arcuate jaw secured through said pivotal connection to said tiller and engaging the vertical standard of the IV stand,
   (B) a movable arcuate jaw pivotally connected at one side to one side of said fixed jaw and engaging said standard, and
   (C) fastening means for securing the opposite sides of said jaw together in rigid engagement with said standard.

3. A combination according to claim 2 wherein said means for positioning said tiller relative to said clamp and standard is a friction joint in said pivotal connection.

4. A combination according to claim 1 wherein said tiller is provided with a hand grip at its free end.

5. A combination according to claim 4 wherein said hand grip is formed from rubber or a rubber-like material.

6. A combination according to claim 1 wherein:
   (A) said vertical standard is hollow,
   (B) said liquid container holder includes a vertical rod adapted for telescopic engagement with said hollow standard, and
   (C) said handle engages the upper end of said standard immediately below said means for securing the container holder.

* * * * *